United States Patent Office

3,505,254
Patented Apr. 7, 1970

3,505,254
STABLE POLYSULFIDE COMPOSITION CONTAINING ENCAPSULATED CURING AGENT
Alfred S. Kidwell, Mountain Lakes, and Norman R. Migdol, Carteret, N.J., assignors to Interchemical Corporation, New York, N.Y., a corporation of Ohio
No Drawing. Filed July 23, 1965, Ser. No. 474,487
Int. Cl. C08g 23/20, 43/00
U.S. Cl. 260—3                                                                14 Claims

ABSTRACT OF THE DISCLOSURE

A one-package curable polysulfide sealing composition comprising a liquid polyalkylene polysulfide having dispersed therein friable capsules of a polymeric film former encapsulating particles of a curing agent for the polysulfide. Curing of the sealing composition is accomplished by applying pressure to break the friable capsule thus liberating the curing agent.

---

This invention relates to polysulfide compositions. More particularly, it relates to polysulfide compositions which are normally stable but which already contain curing agents and may be cured without adding any further curing agent. Our invention provides a "one-package" curable polysulfide composition.

Although polysulfide polymers were the first synthetic rubbers used in this country, being introduced in 1930, the art has experienced great difficulty in developing a commercially practical "one-package" curable liquid polysulfide composition, that is a composition which contains the curing agent for the polysulfide but which is stable and may be stored for long periods of time prior to use. Conventionally, polysulfide compositions containing the curing agent have been found to be highly unstable. Such compositions cross-link and cure readily on storage even at room temperature.

Accordingly, in all existing commercial processes using polysulfides, it is necessary to mix the curing agent with the polysulfide just prior to use. The disadvantages of such a procedure are obvious. Among them are the need to store and keep inventories of two separate items and more important, the requirement that the ultimate user also be a formulator. The results have to depend on the user's skill as a formulator.

We have now discovered a novel "one-package" stable but curable liquid polysulfide composition which already contains the curing agent for the polysulfide but which does not cure or change in any way on storage. It may be stored for periods in excess of six months at ambient conditions. In addition, our cured polysulfide retains all of the desirable properties of the conventional two-package systems.

In accordance with our invention, there is provided a composition in which particles of the solid curing agent are encapsulated in capsules of a film-forming polymeric material. The capsules, which are friable, are dispersed in the liquid polysulfide which is the conventional polyalkylene polysulfide. The polymeric material constituting the capsules or shells is insoluble in the liquid polysulfide. The material is stable upon storage. When the composition is to be used, it is fed to any simple device for breaking the friable capsules such as a two-roll mill or a three-roll mill and then applied, after which it rapidly cures.

For example, on the automobile assembly line, polysulfide compositions have been frequently used as sealants for forming a waterproof joint between the automobile frame and the glass in the front and rear windows of the automobile. It is conventionally the practice to store the curing agent and the polysulfide separately and then mix the right proportions on the line just prior to application. Now, with the present invention, the composition already containing the curing agent is stored until needed and fed directly to the line through, for example, a two-roll mill which breaks the capsules. Clearly, the handling is greatly facilitated.

The liquid polysulfide is the conventional polysulfide which has mercaptan terminals and side groups capable of being cured to form an elastomer by further polymerization and cross-linkage. Any of the standard liquid polysulfides which are conventionally used in the two-package systems are readily utilizable in our composition.

The term encapsulation as used in this invention is intended to mean fully enclosed and sealed within a continuous shell and should be distinguished from forms of coating of particles such as spray coating which are usually discontinuous.

For best results in the practice of this invention, it is preferred that a plurality of particles be encapsulated in each capsule. It is more difficult to break the friable shells or capsules surrounding single particles of curing agent than it is to break the shells of larger capsules containing more than one particle. In fact, it is most preferable to adhere a plurality of particles of the curing agent about a friable core and then to encapsulate this agglomerate in the shell of the film forming polymer. Such a capsule fractures readily and provides curing agent in finely divided form.

Advantageously the capsules are prepared using the fluidized bed technique and apparatus described in U.S. Patent 2,648,609 and in improvement Patent 3,117,027. When a friable core is used, the core particles are the fluidized bed in the apparatus and a slurry of the curing agent particles and a binder for adhering the particles to the core in a suitable solvent are applied to the core as a spray. Then, the procedure is repeated with the core carrying the bound particles of curing agent as the fluidized bed and the polymeric film former which is to be the capsule being applied in solvent as the spray.

The particles of curing agent may be any solid curing agent used for polysulfides. While the peroxides are preferred as they are with the conventional two-package systems, any of the following curing agents may be used: ZnO, PbO, MgO, CaO, BaO, FeO, $Fe_2O_3$, CoO, CuO, $ZnO_2$, $PbO_2$, $CaO_2$, $MnO_2$, $TeO_2$, $SeO_2$, $As_2O_3$, $Sb_2O_3$, $Sb_2O_5$, $SnO_2$, $Pb_3O_4$, $Na_2CrO_4$, $K_2CrO_4$, $Na_2Cr_2O_7$, $K_2Cr_2O_7$, $(NH_4)_2Cr_2O_7$, $NaClO_4$, $KClO_4$, $Ba(ClO_4)_2$, $Na_2B_4O_7$, $NH_4NO_2$.

The polymeric film former is a friable material which is insoluble in the liquid polysulfide. Some suitable polymers having these properties are lignin sulfonates such as calcium magnesium lignin sulfonate, maleic modified phenol-formaldehyde, rosin modified phenol-formaldehydes, pentaerythritol esters of hydrogenated rosin such as Pentalyn H and copolymers of alpha-methyl styrene and vinyl toluene.

When used, the core is preferably a friable material such as pumice, clay or other siliceous materials such as hollow glass spheres, hollow friable spheres of polymeric materials such as phenol-formaldehyde resins and fuller's earth. Alternatively, the core may be a distensible material such as rubber dust. The core may have a size range of from 20 to 800 microns and most preferably from 50 to 300 microns. The particles of curing agent have a particle size of 0.05 to 6 microns.

The binder used to bind the particles to the core should be a material which is soluble in the polysulfide for best results. Some suitable binders include Chlorowax (chlorinated paraffin wax) Arochlors (chlorinated biphenyls and triphenyls) and Piccopale 100 (a hydrocarbon resin, molecular weight 1400, iodine number 145 (Wijs) made by the polymerization of a mixture of alkene and diene monomers having an average molecular weight of 90).

The compositions of this invention are formulated so that the curing agent is present in conventional amounts, that is the curing agent is present in amounts preferably from 0.5 to 100% and most preferably from 2 to 30% of the weight of the polysulfide. In the capsule, the shell is of such a size that in the order of from 0.03 to 1.0 part of film former are preferably present for each part of curing agent. The core has the proportions set forth above. Preferably from 0.05 to 1.0 part of binder for each part of curing agent are used to bind the particles to the core.

In the present specification and claims, all proportions are by weight unless otherwise indicated.

The following examples will illustrate the practice of this invention.

EXAMPLE 1

Using the apparatus shown in U.S. Patent No. 3,117,027,600 g. of pumice particles having an average particle diameter of 200–300 microns are coated with a slurry of 3600 g. lead dioxide, 1200 g. Chlorowax 70 (chlorinated paraffin wax having a 70% chlorine content by weight) and 3600 g. toluene. The pumice particles are maintained as the fluidized bed upon which the slurry is sprayed. The fluidized bed is maintained by hot air at a temperature of about 140°–160° F. During the coating, the toluene evaporates leaving a coating on the pumice particles of lead dioxide bound to the pumice by the Chlorowax 70. The coated particles are removed from the apparatus and passed through a 16 mesh screen to remove any agglomerates.

Then, using the same apparatus, the coated pumice cores are next encapsulated by forming a fluidized bed of the coated cores and spraying a slurry of 540 g. of calcium magnesium lignin sulfonate, 60 g. glycerine and 600 g. of water. The fluidized bed is maintained by hot air at a temperature of about 165°–185° F. During the process, the water evaporates leaving a capsule predominantly of calcium magnesium lignin sulfonate around the coated core. The resulting capsules have a diameter in the range of 300 to 600 microns.

13 parts by weight of the above capsules are dispersed in a conventional polysulfide composition of 100 parts Thiokol LP2 [1], 30 parts carbon black, 5 parts dibutyl phthalate plasticizer, 2 parts silica, 20 parts calcium carbonate and 5 parts Durez 10694 (thermosetting phenol-formaldehyde resin). The resulting composition is very stable. After over 6 months storage at room temperature, no change is noted and the composition is still stable. After storage at 130° F. for over a month, the composition remained stable with no detrimental change.

In order to use and cure the composition, it is passed to an apparatus for mechanically crushing the capsules such as a two-roll mill. The composition is then applied, for example as a joint sealant between window glass and an automobile body frame. The composition cures to a tough rubbery material having all of the desirable properties of cured polysulfide compositions in which the lead dioxide is mixed with the polysulfide just prior to curing.

The stability of the composition may be even further increased by using a clay such as an aluminum silica clay in combination with the calcium magnesium lignin sulfonate in the capsule composition, up to 2 parts of the clay being used for each part of the sulfonate.

The polymer is believed to have a structure corresponding to the formula

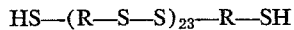

in which R represents the organic group

---

[1] Thiokol LP2 is a liquid polysulfide polymer having molecular weight of 4,000 and prepared by condensing with an alkali polysulfide 98.0 mol percent (2-chlorethyl) formal and 2.0 mol percent of trichloropropane.

It is a polyfunctional polymer having reactive mercaptan terminals and side groups so that in the presence of suitable oxidizing agents it polymerizes and cross links to a rubbery condition.

Thiokol LP32 is a ready substitute for Thiokol LP2. LP32 is a liquid polysulfide polymer having a weight of 4,000 and prepared by condensing with an alkali polysulfide 99.5 mol percent of bis (2-chlorethyl) formal and 0.5 mol percent trichlorpropane.

EXAMPLE 2

Example 1 is repeated using the same ingredients, proportions and similar procedure and conditions except that in the encapsulation step in place of the calcium magnesium lignin sulfonate slurry, there is used a slurry of 600 g. of Arochem 455 (maleic modified phenol-formaldehyde resin having an Acid No. of 60–90 and a M.P. of 135–145° C.) in 1800 g. of methanol.

The resulting polysulfide composition containing the dispersed capsules has all of the desirable properties of the composition of Example 1, except stability at 130° F. is not as good as the composition of Example 1.

EXAMPLE 3

Example 1 is repeated using the same ingredients, proportions and similar procedure and conditions except that in place of the pumice, there is used rubber dust (rubber particles having diameters in the range of 300–500 microns).

The resulting polysulfide composition containing the dispersed capsules has all of the desirable properties of the composition of Example 1.

EXAMPLE 4

Example 1 is repeated using the same ingredients, proportions and similar procedure and conditions except that in place of the pumice, there is used fuller's earth (calcium montmorillonite) particles having diameters in the range of 200 to 300 microns.

The resulting polysulfide composition containing the dispersed capsules has all of the desirable properties of the composition of Example 1.

EXAMPLE 5

Example 1 is repeated using the same ingredients, proportions and similar procedure and conditions except that in place of the pumice, there is used hollow spheres of phenol-formaldehyde resin having an average diameter of 40 microns and a particle density of 0.3 g./cc.

The resulting polysulfide composition containing the dispersed capsules has all of the desirable properties of the composition of Example 1.

EXAMPLE 6

Example 1 is repeated using the same ingredients, proportions and similar procedure and conditions except that in place of the Chlorowax 70, there is used Piccopale 100 (a hydrocarbon resin, molecular weight 1400, iodine number 145 (Wijs) made by the polymerization of a mixture of alkene and diene monomers having an average molecular weight of 90).

The resulting polysulfide composition containing the dispersed capsules has all of the desirable properties of the composition of Example 1.

EXAMPLE 7

Example 1 is repeated using the same ingredients, proportions and similar procedure and conditions except that in place of the lead dioxide, there is used respectively: zinc dioxide, tellurium dioxide and calcium dioxide.

In the case of each of the curing agents, the resulting polysufide composition containing the dispersed capsules has all of the desirable properties of the composition of Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A normally stable composition consisting essentially of a curable liquid polyalkylene polysulfide having dispersed therein a plurality of friable capsules of a polymeric film former which is insoluble in the polysulfide, each of said capsules encapsulating particles of a curing agent for said polysulfide, the particles within each capsule being adhered to a collapsible core made of a material which is unreactive with the other components in the composition, said polysulfide being curable upon the breakage of said capsules.

2. The composition of claim 1 wherein said film former is calcium magnesium lignin sulfonate.

3. The composition of claim 1 wherein said film former is a maleic modified phenol-formaldehyde resin.

4. The composition of claim 1 wherein said film former is a rosin modified phenol-formaldehyde resin.

5. The composition of claim 1 wherein the core is friable.

6. The composition of claim 1 wherein the core is very distensible.

7. The composition of claim 6 wherein the core is rubber.

8. The composition of claim 5 wherein the core is made of a friable siliceous material.

9. The composition of claim 8 wherein the siliceous material is pumice.

10. The composition of claim 6 wherein the core is hollow.

11. The composition of claim 10 wherein the core is a hollow glass structure.

12. The composition of claim 1 wherein the particles are bound to the core by a binder which is soluble in the polysulfide.

13. The composition of claim 12 wherein the binder is a chlorinated paraffin wax.

14. The composition of claim 1 wherein said curing agent is lead dioxide.

References Cited

UNITED STATES PATENTS

| | | | |
|---|---|---|---|
| 3,395,105 | 7/1968 | Washburn et al. | 260—6 |
| 3,202,533 | 8/1965 | Sachsel et al. | 117—72 |
| 3,331,782 | 7/1967 | Deltieure | 252—186 |
| 2,405,650 | 8/1946 | Hartwig et al. | 260—17.5 |
| 2,622,071 | 12/1952 | Harrison | 260—59 |
| 3,041,289 | 6/1962 | Katchen et al. | 252—316 |
| 3,275,579 | 9/1966 | Stierli et al. | 260—79.5 |

OTHER REFERENCES

"NCR Capsules Have Wide Possibilities," National Cash Register Factory News, October 1959, pp. 14–16, National Cash Register Corp.

Phenoplasts, by Carswell, 1947, pp. 267–209.

WILLIAM H. SHORT, Primary Examiner

E. NIELSEN, Assistant Examiner

U.S. Cl. X.R.

260—2.5, 17.5, 24, 25, 37, 79.1, 96, 823, 838